United States Patent
Saderholm et al.

(10) Patent No.: US 6,808,199 B2
(45) Date of Patent: Oct. 26, 2004

(54) SHRINK WRAP FOR INFLATABLE CURTAIN PACKAGE

(75) Inventors: Davin Saderholm, Mission Viejo, CA (US); Blake Heiner, Roy, UT (US); Travis Hess, Farr West, UT (US)

(73) Assignee: Autoliv ASP, Inc., Ogden, UT (US)

( * ) Notice: Subject to any disclaimer, the term of this patent is extended or adjusted under 35 U.S.C. 154(b) by 379 days.

(21) Appl. No.: 10/119,876

(22) Filed: Apr. 9, 2002

(65) Prior Publication Data

US 2003/0188979 A1 Oct. 9, 2003

(51) Int. Cl.[7] ............................................. B60R 21/16
(52) U.S. Cl. ............................ 280/730.2; 280/728.2
(58) Field of Search ........................ 280/728.1, 728.2, 280/730.2

(56) References Cited

U.S. PATENT DOCUMENTS

| | | | | |
|---|---|---|---|---|
| 5,899,486 A | * | 5/1999 | Ibe | 280/728.2 |
| 6,079,732 A | * | 6/2000 | Nakajima et al. | 280/728.2 |
| 6,129,377 A | * | 10/2000 | Okumura et al. | 280/730.2 |
| 6,237,941 B1 | * | 5/2001 | Bailey et al. | 280/730.2 |
| 6,460,879 B2 | * | 10/2002 | Tanase et al. | 280/730.2 |
| 6,626,456 B2 | * | 9/2003 | Terbu et al. | 280/728.2 |
| 2002/0163169 A1 | * | 11/2002 | Fischer | 280/730.2 |
| 2003/0042712 A1 | * | 3/2003 | Henderson et al. | 280/728.2 |
| 2003/0094797 A1 | * | 5/2003 | Sonnenberg | 280/730.2 |

FOREIGN PATENT DOCUMENTS

| | | | |
|---|---|---|---|
| GB | 9109099.3 | 7/1992 | B60R/21/16 |
| GB | 4137691 | 11/1992 | B60R/21/20 |
| GB | 2349618 | 11/2000 | B60R/21/16 |
| JP | 09104307 A | * 4/1997 | |
| JP | 10181493 A | * 7/1998 | |

* cited by examiner

Primary Examiner—Ruth Ilan
(74) Attorney, Agent, or Firm—Sally J. Brown

(57) ABSTRACT

An inflatable curtain package that is made of an inflatable curtain wrapped around by a thin film is disclosed. The inflatable curtain has a number of mounting tabs that allows the inflatable curtain to be attached to a vehicle. The orientation of the thin film allows mounting tabs to extend out of a seam in thin film. The inflatable curtain package may be constructed by aligning a first edge of the thin film to a position near a location wherein the mounting tabs attach to the inflatable curtain. Next, the mounting tabs are positioned over the first edge of the thin film. Then a second edge of the thin film is positioned to overlap the first edge and the attachment location. The two overlapping edges cause the thin film to wrap around the inflatable curtain.

39 Claims, 4 Drawing Sheets

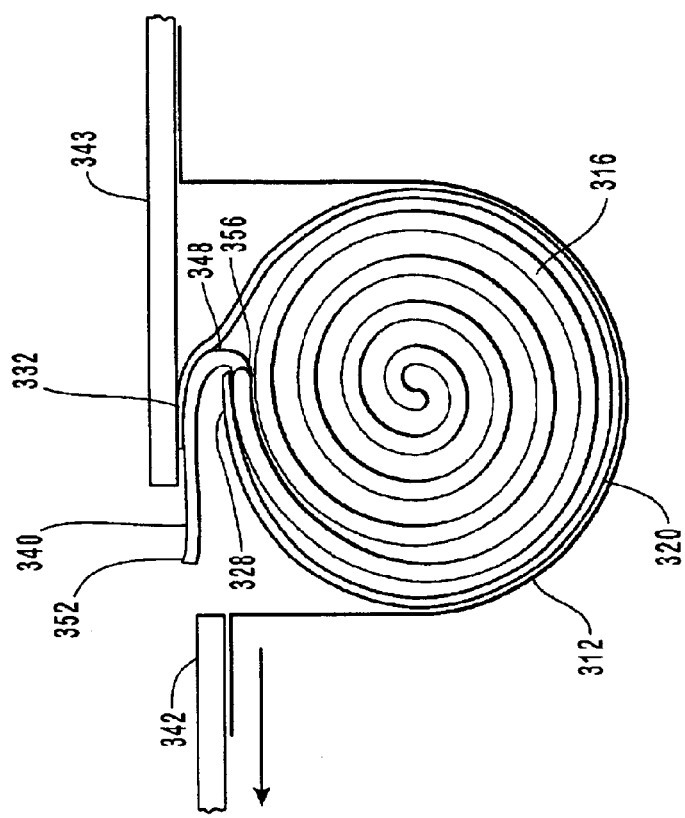
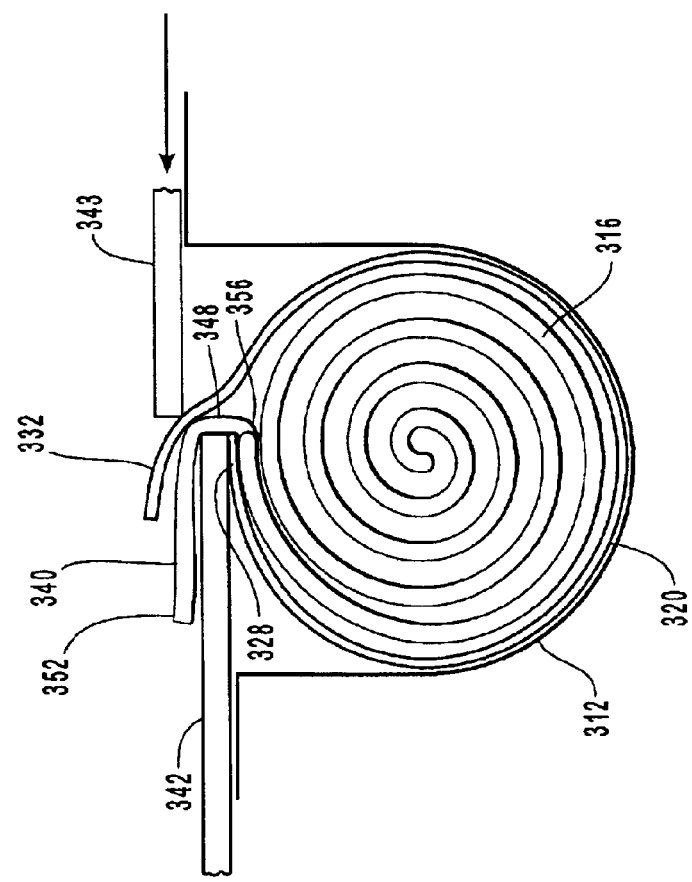

SHRINK WRAP FOR INFLATABLE CURTAIN PACKAGE

BACKGROUND OF THE INVENTION

1. Field of the Invention

The present invention relates to inflatable curtains, and more specifically, to an apparatus and method for wrapping an undeployed inflatable curtain with a film.

2. Technical Background

Airbags and inflatable curtains are well accepted in their use in motor vehicles and have been credited with preventing numerous deaths and accidents. Some statistics estimate that frontal airbags reduce fatalities in head-on collisions by 25% among drivers using seat belts and by more than 30% among unbelted drivers. Statistics further suggest that with a combination of seat belts and airbags, serious chest injuries in frontal collisions can be reduced by 65% and serious head injuries by up to 75%. Thus, airbag and inflatable curtains use presents clear benefits.

In view of the apparent success of airbags and inflatable curtains, automobile designers and the consuming public have been anxious to increase the number of airbags and inflatable curtains present throughout a vehicle. Currently most automobiles being manufactured have driver and passenger side airbags. However, designers are identifying more and more locations to place airbags throughout the vehicle. For example, side impact airbags and overhead inflatable curtains are starting to appear in an increasing number of vehicles. These airbags and inflatable curtains prevent injury that might occur in a side-impact collision or other similar collision.

However, several design problems have been encountered in implementing multiple airbag and inflatable curtains throughout a vehicle cabin. For example, one such problem is the storage size of the inflatable curtain or airbag. Inflatable curtains such as those located along the roof rail may be large and bulky. A large storage size of some inflatable curtains may limit placement locations within a vehicle.

Furthermore, attempting to place an inflatable curtain in a small storage location increases the probability that the folded configuration of the inflatable curtain will be disturbed. Because the fold of an inflatable curtain typically determines the deployment sequence and characteristics of the inflatable curtain, changing the fold of the inflatable curtain may interfere with the inflatable curtain's effectiveness. Disturbing the folded configuration may be even more probable with a large or awkwardly shaped inflatable curtain, where the shape and size make the inflatable curtain difficult to handle.

In order to minimize the storage size of inflatable curtains and to maintain a proper folded configuration, inflatable curtains have been wrapped in various wrapping materials. These wrapping materials maintain the folded configuration and storage size of an inflatable curtain until it deploys. Some materials used to wrap inflatable curtains and airbags may include nylon and plastic materials. These materials provide the proper balance between maintaining the folded configuration and allowing the inflatable curtain to deploy through the material at the desired instant.

The nylon material is typically implemented using a sock type configuration. The undeployed and folded inflatable curtain is enwrapped by the nylon sock by simply pulling the nylon sock around the inflatable curtain. The nylon sock maintains the storage size and folded configuration of the inflatable curtain. A similar configuration has also been accomplished through using a plastic material or thin film to enwrap the inflatable curtain. The plastic material or thin film may be provided in a tube shape that may be pulled around the undeployed and folded inflatable curtain.

Unfortunately, pulling an elongated and undeployed inflatable curtain through a nylon sock or thin film tube can be tedious and time consuming. Another drawback of using a sock or tube-like member is that many types of mounting members used to attach an inflatable curtain package to a vehicle are covered by the sock or tube. In ordered to release the mounting tabs from underneath the wrapping material, a number of slits or openings must be made in the material and mounting tabs must be manually pulled through the wrapping material.

This increased number of steps in the manufacturing process increases the cost and cycle time of manufacturing an inflatable curtain package. Additionally, manually cutting a series of slits or openings in the wrapping material presents the potential for damage to the wrapping material or inflatable curtain, causing the inflatable curtain to not deploy properly. Thus, current methods for maintaining the storage size and folded configuration of an inflatable curtain do not provide the most efficient and effective ways of wrapping a material around an inflatable curtain or airbag.

Therefore, what is needed is a method and apparatus that is capable of rapidly and inexpensively wrapping a confining material around an undeployed and folded inflatable curtain. Furthermore, a method for easily presenting mounting tabs out of the wrapping material is also needed.

BRIEF SUMMARY OF THE INVENTION

The apparatus and method of the present invention have been developed in response to the present state-of-the-art, and, in particular, in response to problems and needs in the art that have not yet been fully resolved by currently available airbag and inflatable curtain systems. Thus, one objective of the present invention is to provide an apparatus and method to wrap inflatable curtain for installation. Another objective of the present invention is to provide an apparatus and method to maintain the folded configuration of inflatable curtain by shrink wrapping a film around the curtain. Other objectives of the present invention will become obvious from the following disclosure.

An inflatable curtain package is provided comprising an inflatable curtain and a thin film. The inflatable curtain has a deployed state and an undeployed state. The undeployed inflatable curtain may be in a rolled configuration or folded configuration. Furthermore, the undeployed inflatable curtain may be a generally oblong and elongated shape. In the undeployed state the inflatable curtain has a plurality of mounting tabs extending from the inflatable curtain.

The undeployed inflatable curtain is wrapped in a thin film. The thin film is characterized as having a first edge and a second edge, such that the thin film may substantially enwrap the inflatable curtain, while in deployed state. The wrapping of the thin film is configured to overlap the first edge and the second edge of the thin film. The thin film is comprised of material that is capable of releasing the inflatable curtain as the inflatable curtain deploys. The thin film may incorporate a perforation along its length to provide a separation point in the thin film from which the inflatable curtain made deploy.

Furthermore, the thin film may be a shrinkable material that shrink wraps around the undeployed inflatable curtain. The thin film could be shrink wrapped by placing the inflatable curtain package, comprising the undeployed inflatable curtain enwrapped by the thin film, in an oven for a duration of time. Additionally, the thin film may be made of a material that allows the first edge and the second edge of the thin film to be heat sealed together.

The method for creating the inflatable curtain package may be accomplished by first providing a thin film and an undeployed inflatable curtain. The thin film may have a first edge and a second edge and the undeployed inflatable curtain may have a plurality of mounting tabs attached at an attachment location.

The thin film enwraps the inflatable curtain by first selectively aligning the first edge of the thin film to a position proximate to the attachment location of the mounting tabs. Next the mounting tabs are positioned substantially over the first edge of the thin film. Then, the second edge of the thin film is selectively aligned to a position of overlapping the first edge and the attachment location. The alignment of the second edge should be such that the thin film substantially enwraps the undeployed inflatable curtain.

Once the thin film is wrapped around the inflatable curtain, the overlap may be sealed. Various methods may be employed to accomplish the sealing process. One method is to apply a heating element to the overlap, such that the two edges of the overlap bond together. Alternatively, an adhesive tape or chemical material may be used to seal the two edges together.

After the thin film is sealed around the inflatable curtain, the thin film may be shrink wrapped. Shrink wrapping may be accomplished by placing the inflatable curtain wrapped by the thin film in an oven for determined amount of time. Depending upon the properties of the thin film, the thin film will shrink around the inflatable curtain to maintain the folded configuration and, in some instances, decrease the folded size of the inflatable curtain.

The thin film may be supplied for manufacturing in several ways. The thin film may be provided in a pre-cut sheet that is sized for the individual inflatable curtains. Alternatively, the thin film made be continuously fed from a roll and cut to the desired length corresponding to the length of the undeployed inflatable curtain. Furthermore, a perforation may be added to the thin film before or after the thin film is wrapped around the undeployed inflatable curtain.

One specific embodiment of a method for manufacturing an inflatable curtain package may comprise first providing a thin film and an inflatable curtain, as discussed previously. The thin film may have a first edge and the second edge and the undeployed inflatable curtain may have a plurality of mounting tabs attached at an attachment location. The thin film may then be placed in a channel, such that the first edge and the second edge protrude from the channel. Then the undeployed inflatable curtain is placed in the channel on top of the thin film.

Next a first blade is tangentially displaced across the undeployed inflatable curtain. While displacing across the undeployed inflatable curtain the first blade displaces the first edge of the thin film over the undeployed inflatable curtain to a position proximate to the attachment location. Then, a second blade tangentially displaces across the undeployed inflatable curtain, such that the second blade further displaces the second edge of the thin film and the mounting tabs over the first blade. Finally, the first blade is retracted and the first edge and second edge of the thin film are adhered together.

These and other possible advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings only provide selected embodiments of the invention and are not therefore to be considered limiting in scope, the invention will be described and explained with additional specificity and detail through the use of the accompanying drawings in which:

FIG. 2C is a side view illustrating the step of wrapping a second edge around the inflatable curtain.

FIG. 2D is a side view illustrating the step of bringing the two edges in contact.

DETAILED DESCRIPTION OF THE PREFERRED EMBODIMENTS

The preferred embodiments of the invention are now described with reference to FIGS. 1–2, where like reference numbers indicate identical or functionally similar elements. The members of the present invention, as generally described and illustrated in the figures, may be implemented in a wide variety of configurations. Thus, the following more detailed description of the embodiments of the system and method of the present invention, as represented in the figures, is not intended to limit the scope of the invention as claimed, but is merely representative of presently preferred embodiments of the invention.

Figure 1:
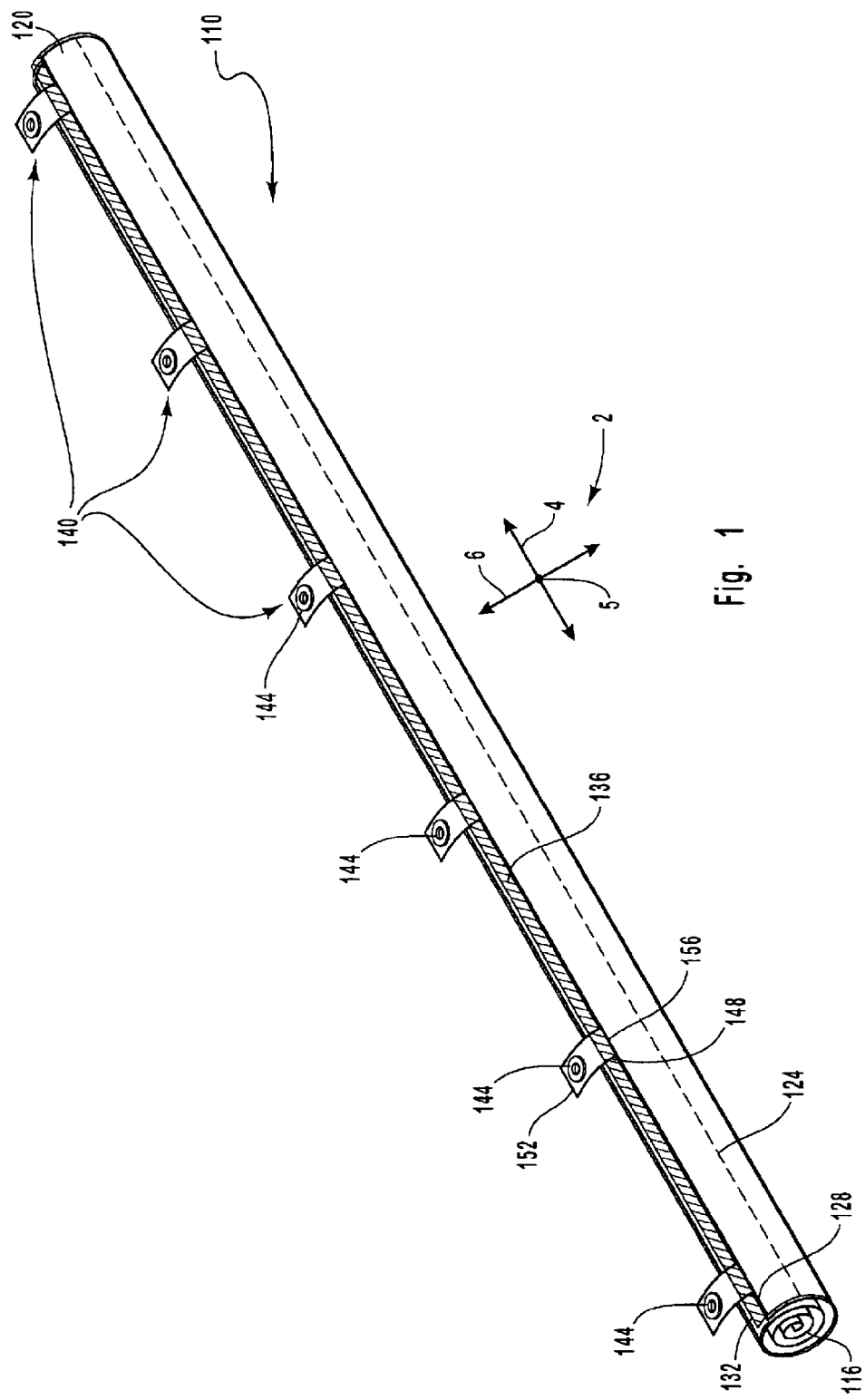
FIG. 1 is a perspective view of inflatable curtain package.

Referring now to FIG. 1, an inflatable curtain package 110 is illustrated. The inflatable curtain package 110 generally comprises an undeployed inflatable curtain 116 enwrapped by a thin film 120. The thin film 120 and inflatable curtain 116 cooperate to maintain the storage size and folded configuration of the inflatable curtain package 110. The storage size and folded configuration of the inflatable curtain package 110 may have multiple variations.

In order to maintain the proper folded configuration and storage size of the inflatable curtain 116, a thin film 120 is wrapped around the folded, undeployed inflatable curtain 116. The thin film 120 is designed to maintain the storage size and folded configuration of the inflatable curtain 116, while still allowing the inflatable curtain 116 to easily deploy through the thin film 120. In maintaining the storage size of the inflatable curtain 116, the thin film 120 confines the inflatable curtain 116 so that it does not expand in size during shipment or installation. Furthermore, the thin film 120 maintains the folded configuration of the inflatable curtain 116 by preventing portions of the inflatable curtain 116 from separating or moving relative to itself.

The thin film 120 may be any type of film or material that is capable of enwrapping an undeployed inflatable curtain 116 to maintain the storage size and the folded configuration. In one variation, it may be preferred for the thin film 120 to be a shrinkable wrap. The shrinkable wrap would allow the thin film 120 to be loosely wrapped around the undeployed inflatable curtain 116, where the thin film 120 would be subsequently shrunk around the inflatable curtain 116. The shrinking thin film 120 would maintain the storage size and folded configuration of the inflatable curtain 116.

Furthermore, the shrinkable thin film 120 may decrease the storage size even more than would be obtained by simply folding the inflatable curtain 116. This is possible because shrinking the thin film 120 produces a compressive force. The compressive force produced by the shrinking thin film 120 may be sufficient to compress the inflatable curtain 116 to form a tight inflatable curtain package 110. Thus, the inflatable curtain 116 may be only loosely folded and the size further reduced by shrinking the thin film 120 around the inflatable curtain 116.

Other variations may not employ a shrinkable thin film 120 to wrap the inflatable curtain 116. Rather, the thin film 120 may simply be wrapped around the inflatable curtain 116 to prevent the inflatable curtain 116 from unfolding or enlarging. These materials may or may not be a plastic type of material. For example, a nylon or other material that is capable of opening during the deployment of an inflatable curtain may be used. However, shrink wrapping the inflatable curtain 116 will provide a tighter fit around the inflatable curtain 116 to decrease to overall size and provide greater security in maintaining the folded configuration.

Generally, the storage size and folded configuration may be dependent on each other, depending upon the application. In some applications, the storage size may be the limiting feature of the inflatable curtain package 110. This may occur when the inflatable curtain package 110 is being placed in a generally small storage location. For example, the inflatable curtain package 110 illustrated in FIG. 1 is configured to be placed along a roof rail. Because storage locations along the roof rail are often small, the folded configuration of the inflatable curtain 116 must also be generally small.

In other applications, the folded configuration may be the limiting feature. In many inflatable curtain 116 applications, the deployment of the inflatable curtain 116 depends upon the folded configuration. If the inflatable curtain 116 is not correctly folded or if the fold is incorrectly situated, the inflatable curtain 116 may not properly deploy. In determining a proper folded configuration of an inflatable curtain 116, the size of the folded inflatable curtain 116 must be considered. Conversely, when determining the size of an inflatable curtain 116, the folded configuration must similarly be considered.

While the thin film 120 is preferably of sufficient strength to maintain the folded configuration of the inflatable curtain 116, the thin film must also be capable of releasing the inflatable curtain 116 at the proper deployment instant. In order to balance these two opposing design parameters, the thin film 110 enwrapping inflatable curtain 116 may have a perforation 124 or other similar feature along the longitudinal length 4 of the inflatable curtain 116.

The perforation 124 may be a series of holes in the thin film 120 along the length of the inflatable curtain package 110 to establish a weak point in the wrapping of the thin film 120. When the inflatable curtain 116 deploys, the inflating curtain 116 will apply a force against the confining thin film 120. As the force from the inflatable curtain 116 increases, the perforation will provide a designed failure location where the inflatable curtain package 110 will open. The perforation 124 or similar feature allows the location where the thin film 120 opens to be controlled. Controlling the opening of the thin film 120 may be important in directing the deployment direction of the inflatable curtain 116.

Other variations of the perforation 124 in the thin film 120 may also exist. For example, a line in the thin film 120 across the longitudinal 4 length of the inflatable curtain 116 may be partially melted. This melted section of the thin film 120 will provide a section that is slightly more brittle and thus weaker than the rest of the thin film 120. This brittle location will provide a point of failure in the thin film 120 as the inflatable curtain deploys. Alternatively, a thin line of chemicals may be applied along the longitudinal length of the inflatable curtain 116 which will similarly weaken a portion of the thin film 120. Similarly, this chemically induced weak point will provide a location for opening the thin film 120. Generally, any method of providing a weak location to induce a controlled opening of the thin film 120 may be applied to the inflatable curtain package 110.

The perforation 124 may be placed in the thin film 120 before or after the film is wrapped around the inflatable curtain 116, depending upon the application. In applications where the perforation 124 is placed in the thin film 120 after the thin film 120 has been wrapped around the inflatable curtain 116, consideration must be made so as not to damage the inflatable curtain 116. However, the relative strengths between the thin film 120 and material of the inflatable curtain 116 are such that the thin film 120 may be easily pierced in multiple locations without damaging the inflatable curtain 116.

Furthermore, when creating the perforation 124 in the thin film 120 after the thin film 120 is wrapped around the inflatable curtain 116, the perforation 124 may be added before or after the thin film 120 is shrink wrapped. If the perforation 124 is added to the thin film 120 before the thin film 120 is shrink wrapped around the inflatable curtain 116, the perforation 124 must be configured so as not to open during the shrinking process.

Alternatively, the perforations 124 may be placed in the thin film 120 before the thin film 120 is wrapped around the inflatable curtain 116. However, the perforation 124 is a designed weak point in the thin film 120. Thus, there is a possibility of the thin film 120 tearing along the perforation 124 during assembly. To prevent premature separation of the perforation 124, the sequence in which the perforation 124 is placed in the thin film 120 must be considered in the context of the overall manufacturing assembly process.

The thin film 120 may be provided in several forms. The thin film 120 may be supplied in individual sheets or on a continuously fed roll. The individual thin film 120 sheets may be substantially rectangular sections. The sheets could be sized for various inflatable curtains 116. The length of the rectangular sheet could correspond to the longitudinal 4 length of the undeployed inflatable curtain 116 and the width of the rectangular sheet could correspond to the circumference of the undeployed inflatable curtain 116.

The continuously fed roll could provide similarly shaped sheets of thin film 120, which are cut to size during the assembly process. The length of the thin film 120 sheets fed from the roll could be measured and cut as it is being applied. The width of the roll would similarly correspond to the circumference of the undeployed inflatable curtain 116. The width of the thin film, whether from individual sheet or a roll, may be characterized as having a first edge 128 and a second edge 132. The first edge 128 and the second edge 132 are substantially parallel.

The length and width of the thin film 120 may vary depending upon the application. Generally, the length of the thin film 120 is substantially equal to the length of the inflatable curtain 116. However, the thin film 120 may be longer or shorter than the undeployed inflatable curtain 116. Similarly, the width of the thin film 120 is generally equal to the circumference of the folded and undeployed inflatable curtain 116.

However, it may be preferred for the width of the thin film 120 to be slightly larger than the circumference of the undeployed inflatable curtain 116. By having the width of the thin film 120 larger than the circumference, the first edge and the second edge 132 may form an overlap 136. The overlap 136 provides a location to attach the first edge 128 and the second edge 132 together. If the width of the thin film 120 is narrower than the circumference of the undeployed inflatable curtain 116, a small gap in the thin film 120 would occur. While a type of strap or tape could bridge the gap to secure the first edge 128 to the second edge, this would add additional steps and materials and thus may not be preferred.

Generally, the overlap 136 of the first edge 128 and the second edge 132 provides an adequate location to seal the thin film 120. The overlap 136 may be sealed in several ways. For example, the overlap may be heat bonded together or may be adhered together with an adhesive.

Heat bonding may be accomplished simply by introducing a heat source along the overlap 136. The heat source bonds the first edge 128 and the second edge 132 together. This creates a secure bond between the two edges 128, 132. Yet, consideration must be given to the material properties of the inflatable curtain 116.

If the material used in the inflatable curtain 116 is not capable of withstanding the heat bonding process, then an adhesive may be preferred. An adhesive used to seal the overlap 136 could be simply applied between the two edges 128, 136. Alternatively, an adhesive may be pre-applied to one of the edges 128, 132 before the thin film 120 is wrapped around the inflatable curtain 116. In yet another variation, a bonding strip may simply be placed over the overlap to secure the two edges 128, 132 together. However, because most materials used in inflatable curtain designs are capable of withstanding a small heat bonding process, heat bonding may be generally preferred over adhesive application, because of the additional cost of the adhesive as well as the associated manufacturing time.

Besides attaching the two edges 128, 132 of the thin film 120 together, the overlap 136 provides a position where a plurality of mounting tabs 140 extend from the body of the inflatable curtain 116. The mounting tabs 140 are configured to attach the inflatable curtain package 110 to a vehicle. The mounting tabs 140, depending upon their shape, will have a base portion 148 and an end portion 152. The end portion 152 of the mounting tabs 140 generally extend out from the thin film 120. The base portion 148 of the mounting tabs 140 are generally attached to the inflatable curtain 116 at an attachment location 156.

The attachment location 156 is simply the location in which the mounting tabs 140 intersect with the inflatable curtain 116. The mounting tabs 140 may be sewn to the inflatable curtain 116 or may be integrally formed to the inflatable curtain 116. In some embodiments, the inflatable curtain 116 and the mounting tabs 140 are made of a woven fabric material. The woven mounting tabs 140 may be integrally formed to the inflatable curtain 116 when the inflatable curtain 116 is manufactured. Alternatively, the mounting tabs may be constructed of a plastic or metal material that is attached to the inflatable curtain 116.

The attachment location 156 of the mounting tabs 140 may be at the edge of the unfolded inflatable curtain 116. Alternatively, the attachment location 156 may be in several other positions on the inflatable curtain 116. The position of the attachment location 156 should generally allow the end portion 152 of the mounting tabs 140 to extend away from the body of the undeployed inflatable curtain 116. The extending mounting tabs 140 may further include mounting holes 144 at the end portion 152 of the mounting tabs 140. The mounting holes 144 allow for the mounting tabs 140 to be bolted, riveted, or otherwise secured to the frame of a vehicle.

The dimensions of the mounting tabs 140 and the position of the overlap 136 may be related to each other, depending upon the application. Generally, the shorter the mounting tabs 140, the closer the overlap 136 must be to the attachment location 148 of the mounting tabs 140. Conversely, the attachment locations 148 of longer mounting tabs 140 may be further from the overlap 136 and still extend out of the thin film 120 at the overlap 136 location.

However, it may be preferable for the attachment location 148 and the overlap 136 to be relatively close. Because the mounting tabs 140 are configured to support the inflatable curtain package 110, an attachment location 148 that is not in a close proximity of the overlap 136 may tend to separate the overlap 136. Therefore, an inflatable curtain package 110 where the base portion 148 of the mounting tabs 140 is substantially under the overlap 136 may be more secure.

A process for creating an inflatable curtain 116 package 110 may be described by discussion of the individual steps. First, a thin film 120 and undeployed inflatable curtain 116 are provided. The thin film 120 has a first edge 128 and the second edge 132 that correspond to both edges of the width of the thin film 120. The inflatable curtain 116 has a plurality of mounting tabs 140 attached to the inflatable curtain 116 at an attachment location 156.

Next, the first edge 128 of the thin film 120 is selectively aligned to a position proximate to the attachment location 156. In aligning the first edge 128 to the attachment location 156 the first edge 128 is substantially parallel to the longitudinal axis 4 of the undeployed inflatable curtain 116. Then, the mounting tabs 140 are positioned substantially over the first edge 128 of the thin film 120. The mounting tabs 140 need not necessarily be directly contacting the first edge 128 of the thin film 120, they need only be in a position selectively over the first edge 128 of the thin film 120.

Finally, the second edge 132 of the thin film 120 is selectively aligned to position overlapping the first edge 128 and the attachment location 156. The overlap 136 of the second edge 132 with the first edge 128 should orient the thin film 120 such that the thin film 120 substantially enwraps the undeployed inflatable curtain 116. Thus, an inflatable curtain 110 package is produced having an undeployed inflatable curtain 116 wrapped about by a thin film 120 and having a plurality of mounting tabs 140 extending out of the thin film 120.

Figure 2A:
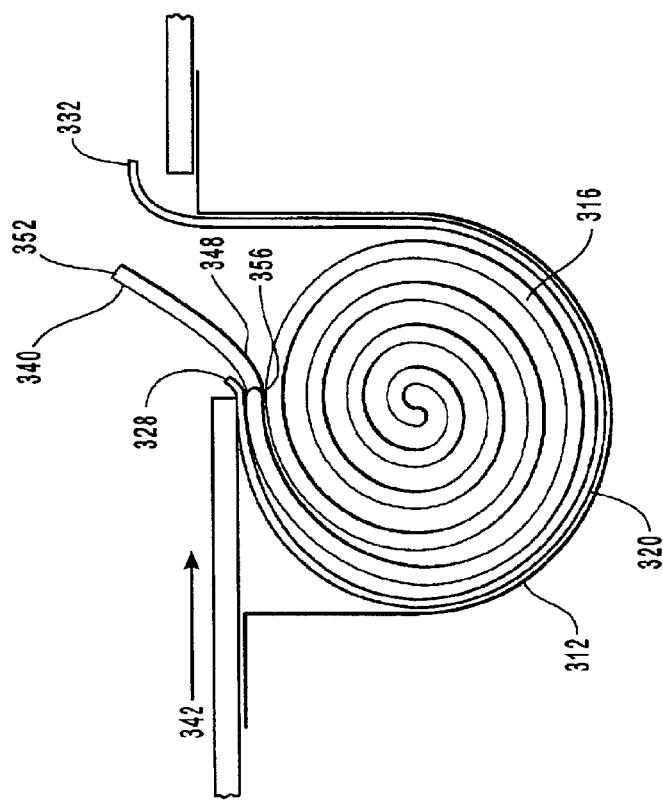
FIG. 2A is a side view of an inflatable curtain and a thin film placed in a channel.

Referring now to FIGS. 2A–E, a side view of an assembly process is illustrated. FIG. 2A illustrates a channel 312 configured to hold and maintain an undeployed inflatable curtain 316 and a thin film 320. The channel 312 may be any number of shapes or fixtures capable of assisting the assembly of the inflatable curtain package 110. For example, the channel 312 may be "U" shaped, "V" shaped or a similar rectangular shaped channel 312. The shapes of alternative channel 312 embodiments may vary depending upon the type of inflatable curtain 316 and thin film 320.

The channel 312 is generally used to provide a platform to assist in wrapping the thin film 320 around the undeployed inflatable curtain 316 to create an inflatable curtain package 110. However, the inflatable curtain package 110 may be assembled on a table without the use of the channel 312. FIGS. 2A–E merely illustrates one method of conducting the assembly process. The channel 312 may be similar in length to the undeployed inflatable curtain 316, alternatively, the channel 312 may be shorter or longer than the undeployed inflatable curtain 316.

In one variation of the assembly process, a sheet of thin film 320 is first placed in the channel 312. The sheet of thin film 320 may be provided in previously cut sheets to the desired length. Alternatively, a roll of thin film 320 may be placed adjacent to the channel 312. A length of thin film 320 is then be dispensed from the roll and placed into the channel 312. Once the desired length of thin film 320 is placed in the channel 312, the thin film is cut away from the roll. Distributing the thin film 320 roll may be preferable over previously cut sheets of thin film 320, because a single roll could provide a continuous supply of thin film 320 for varying lengths of undeployed inflatable curtains 316.

The thin film 320 is placed in the channel 316 such that the first edge 328 and the second edge 332 extend out of the channel 316, as illustrated in FIG. 2A. The purpose of extending the first edge 320 and the second edge 330 out of the channel 316 will be demonstrated in the subsequent assembly figures. Once the thin film 320 is positioned in the channel 312 the undeployed inflatable curtain 316 is placed on top of the thin film 320.

Figure 2B:
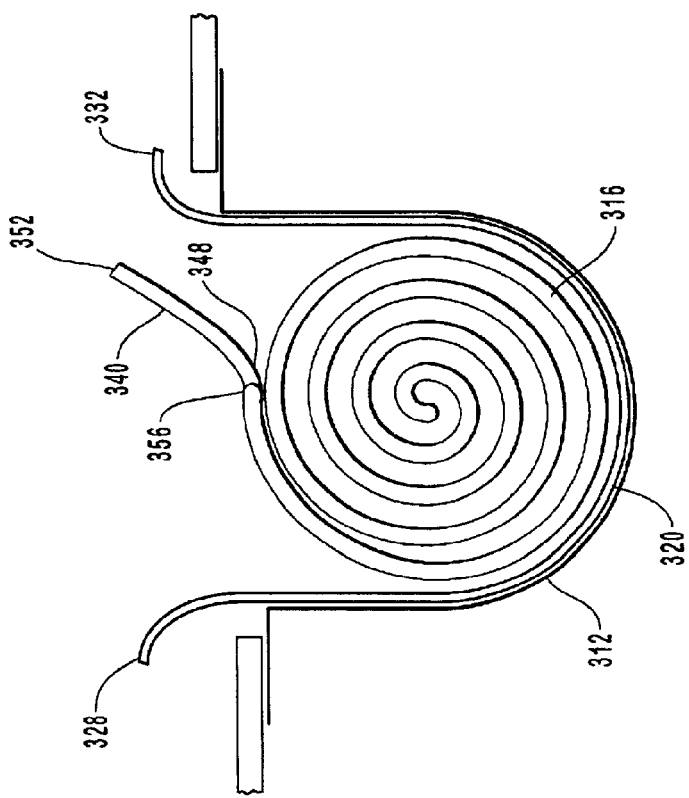
FIG. 2B is a side view illustrating the step of wrapping a first edge around the inflatable curtain.

The undeployed inflatable curtain 316 may be positioned within the channel 312 such that the mounting tabs 340 are on top of the undeployed inflatable curtain 316 and extend out of the channel 312. However, the mounting tabs 340 may extend from the inflatable curtain 316 at multiple other locations during the assembly process. Once the thin film 320 and inflatable curtain 316 are positioned within the channel 312, a first blade 342 translates across the top of the channel 312 and tangentially across the undeployed inflatable curtain 316, as illustrated in FIG. 2B. The translating first blade 342 moves the first edge 328 of the thin film 320 over the top of a portion of the inflatable curtain 316.

The first blade 342 may be any type of displacing device. The first blade 342 need not necessarily be a sharp or cutting object. The first blade 342 need only be capable of fitting between the first edge 328 of the thin film 320 and the channel 312. Therefore, the first blade 342 may not require the ability to cut. The first blade 342 may only require a tapered edge to fit between the first edge 328 of the thin film 320 and a channel 316.

The first blade 342 displaces the first edge 328 of the thin film 320 to a position over the undeployed inflatable curtain 316 and adjacent to the attachment location 356 of the mounting tabs 340. The first edge 328 of the thin film 320 may be touching the attachment location 356 of the mounting tabs 340 or may be spaced at a selective distance, leaving a slight gap. The first edge 328 may be the end of the sheet of thin film 320 or may alternatively be a fold in the thin film 320 that creates the first edge 328. As the first blade 342 displaces the first edge 320 of the thin film 320 over the undeployed inflatable curtain 316, a portion of the thin film 320 enwraps a corresponding portion of the inflatable curtain 316.

Once the first blade 342 has displaced the first edge 328 of the thin film 320 over the inflatable curtain 316, a second blade 343 displaces the mounting tabs 340 and the second edge 332 over the inflatable curtain 316, as illustrated in FIG. 2C. The second blade 343 also translates generally tangentially to the undeployed inflatable curtain 316. The second edge 332 of the thin film 320 is positioned over the inflatable curtain 316 such that the second edge 332 overlaps a portion of the first edge 328. Additionally, because the first edge 328 of the thin film 320 is adjacent to the attachment location 356 of the mounting tabs 340, a portion of the second edge 332 may overlap the base portion 348 of the mounting tabs 340.

As the second blade 343 displaces the second edge 332 of the thin film 320 over the attachment location 356 and the base portion 348 of the mounting tabs 340, the second blade 343 may or may not displace the mountain tabs 340. The mounting tabs 340 may be in several positions during the assembly process. FIGS. 2A, B illustrates the mounting tabs 340 as initially positioned to the right of the attachment location 356. In this position, the mounting tabs 340 are positioned out of the way of the first edge 328 of a thin film 320. Thus, as the first edge 328 of the thin film 320 is displaced over the inflatable curtain 316, the mounting tabs 340 wound not interfere with the motion of the blades 342, 343.

However, the mounting tabs 340 may just as well be positioned to the left of the attachment location 356. In this configuration, the first blade 342 will simply push the first edge 328 of the thin film 320 under the end portion 352 of the mounting tabs 340. Alternatively, the mounting tabs 340 may be positioned in a vertical orientation. In this orientation, the mounting tabs 340 would not obstruct the placement of the first edge 328 of the thin film 320. The vertically oriented mounting tabs 340 are simply displaced over the first edge 328 when the second blade 343 displaces the second edge 332 of the thin film 320.

Once the second blade 343 has displaced the second edge 332 and the mounting tabs 340 over the attachment location to 356, the first blade 342 retracts, as illustrated in FIG. 2D. Retracting the first blade 342 allows the first edge 328 and the second edge 332 to come in direct contact along portions of the inflatable curtain 316, producing an overlap 336. By creating an overlap 336 of the first edge 328 and the second edge 332, the mounting tabs 340 may extend out from the thin film 320. Additionally, the overlap provides a location in which to seal the two edges 328, 332 of the thin film together.

The orientation and placement of the overlap 336 in relation to the attachment location 356 of the mounting tabs 340 may vary depending upon the design of the inflatable curtain 316. For example, in the inflatable curtain 316 illustrated in FIGS. 2B–E, the first edge 328 is proximate to the attachment location 356, such that the majority of the length of the mounting tabs 340 extends out from the thin film 320. However, varying designs of mounting tabs 340 may extend from the thin film 320.

In one example, the mounting tabs 340 may be substantially elongated. The elongated mounting tabs 340 could thus have an attachment location 356 that is spaced at a distance from the overlap 336 of the first edge 328 and the second edge 332. This provides that a substantial portion of the mounting tabs 340 would wrap around the undeployed inflatable curtain 316 before the end portion 352 extends out from the overlap 136 in the thin film 320. Thus, only a fraction of the mounting tabs 340 would actually extend out of the thin film 320.

However, there are some disadvantages to this configuration. Because the mounting tabs 340 are designed to hold the inflatable curtain package 110 to vehicle, they must support the weight of the inflatable curtain package 110.

When the weight of the inflatable curtain package 110 load is placed on the mounting tabs 350, the weight will tend to apply an upwards force on the mounting tabs 350 until it reaches the attachment location 356. This may cause the overlap 336 to separate and the inflatable curtain 316 to unfold after being installed in the vehicle. Therefore, it may be preferable for the overlap 336 to be positioned relatively closely the attachment location 356 of the mounting tabs 340. This is the configuration illustrated in FIGS. 2D, E.

Once the first edge 328 and the second edge 332 are in overlapping configuration, the two edges 328, 332 may be sealed together. One method of sealing the two edges 328, 332 together is through a heat bonding process. The heat bonding process occurs as a heating element is placed along the overlap 336. The heating element will seal the two edges 328, 332 together. The two edges 328 332 will seal around the mounting tabs 340 extending out of the overlap 336. Thus, the base portion 348 of the mounting tabs 340 will be partially sealed under the thin film 320.

Figure 2E:
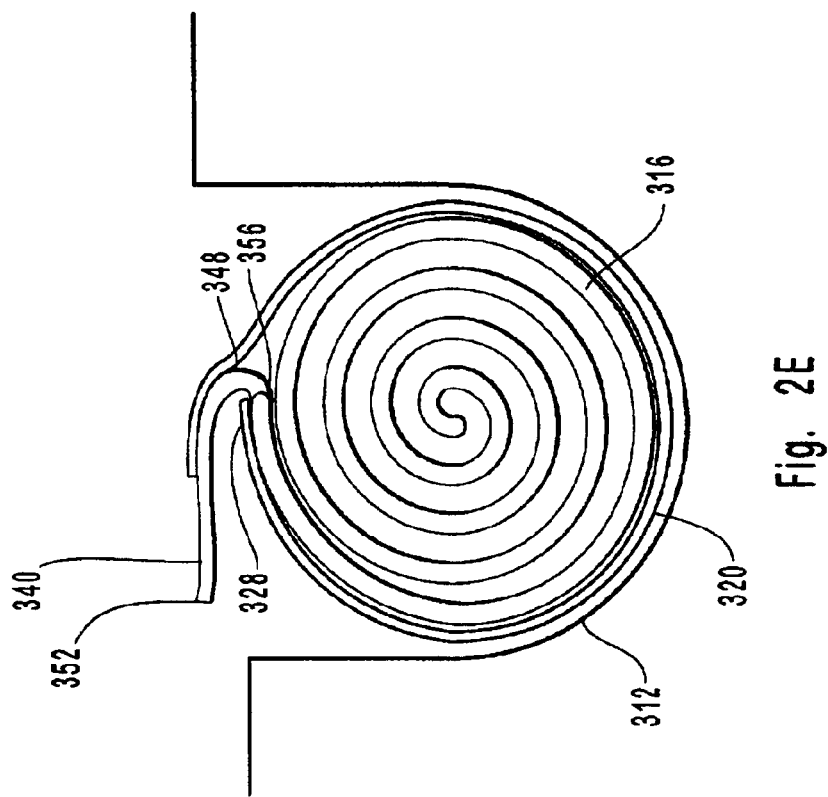
FIG. 2E is a side view of an inflatable curtain wrapped by a thin film.

Alternatively, the first edge 328 and the second edge 332 may be sealed together with an adhesive. An adhesive such as a glue or tape may be implemented to seal the two edges 328, 332. However, heat bonding may be preferred because it requires no extra material to apply during the assembly process. Heat bonding may use the natural adhesive characteristics of the thin film 320. The two edges 328, 332 of the thin film 320 are adhered to each other by simply placing a heating element the overlap 336 to seal inflatable curtain package 110. Furthermore, because the temperatures needed to heat seal portions of a thin film 320 together are generally low, no damage is caused to the mounting tabs 340 of inflatable curtain 316. Once the first edge 328 and the second edge 332 are sealed together, the inflatable curtain 316 is substantially enwrapped by the thin film 320, as illustrated in FIG. 2E.

The process illustrated in FIGS. 2A-E is only one example of an assembly process capable of producing an inflatable curtain package 110. For example, the order of the assembly process illustrated above may be reversed. The second edge 332 may first be displaced over the attachment location 356 of the mounting tabs 340. Next, the first edge 328 could be displaced under the second edge 332 and under the base portion 348 of the mounting tabs 340. This process may or may not include displacing the mounting tabs 340 during these steps.

After the thin film 320 is enwrapped around the inflatable curtain 316, the inflatable curtain package 110 is ready to be installed in the vehicle. However, additional steps may be taken in the assembly process to further maintain the storage size and folded configuration of the inflatable curtain 316. For example, the thin film 320 may be heat shrunk around the inflatable curtain package 110. One method of heat shrinking the thin film 320 is to place the assembled inflatable curtain package 110 into an oven. At a temperature determined by the thin film material 320, the thin film 320 will contract around the folded inflatable curtain 316. The shrinking process will not only maintain the inflatable curtain 316 in its folded configuration, but it may also further reduce the storage size of the inflatable curtain package 110 as it contracts.

One having ordinary skill in the art will recognize that additional embodiments of the present method and apparatus are possible without departing from the present disclosure. The apparatus need only to provide an undeployed inflatable curtain enwrapped by a thin film such that a plurality of mounting tabs may extend through a seam in the thin film. Furthermore, the method corresponding to the apparatus simply provides for various methods of wrapping the thin film around the inflatable curtain such that the mounting tabs extend out of the thin film.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A method for wrapping a thin film around an undeployed inflatable curtain, wherein the thin film has a first edge and a second edge, and the undeployed inflatable curtain has a plurality of mounting tabs attached to the inflatable curtain at an attachment location, the method comprising:
   selectively aligning the first edge of the thin film to a position proximate to the attachment location of the mounting tabs;
   positioning the mounting tabs substantially over the first edge of the thin film;
   selectively aligning the second edge of the thin film to a position overlapping the first edge and the attachment location, such that the thin film substantially enwraps the undeployed inflatable curtain.

2. The method as recited in claim 1, further comprising adhering the overlapping portion of the second edge of the thin film to the first edge of the thin film.

3. The method as recited in claim 2, wherein the first edge of the thin film and the second edge of the thin film are heat bonded together.

4. The method as recited in claim 2, wherein the first edge of the thin film and the second edge of the thin film are adhered by an adhesive.

5. The method as recited in claim 1, further comprising placing a perforation in the thin film.

6. The method as recited in claim 1, further comprising:
   placing the thin film in a substantially elongated "U" shaped channel, such that the first edge extends out of a first side of the channel and the second edge extends out of the second side of the channel;
   placing the undeployed inflatable curtain in the channel.

7. The method as recited in claim 1, further comprising cutting the thin film to a length larger than the circumference of the undeployed inflatable curtain.

8. The method as recited in claim 1, further comprising shrinking the thin film around the inflatable curtain.

9. The method as recited in claim 8, wherein shrinking the thin film comprises placing the inflatable curtain enwrapped by the thin film in an oven.

10. The method as recited in claim 1, wherein the undeployed inflatable curtain is in a rolled state.

11. The method as recited in claim 1, wherein the undeployed inflatable curtain is in a folded state.

12. The method as recited in claim 1, wherein the mounting tabs are woven to the inflatable curtain.

13. The method as recited in claim 1, wherein the thin film is shrinkable.

14. The method as recited in claim 1, further comprising feeding the thin film from a roll, and cutting the thin film to a length generally equal to the length of the inflatable curtain.

15. A method for wrapping a thin film around an undeployed inflatable curtain, wherein the thin film has a first edge and a second edge, and the undeployed inflatable curtain has a plurality of mounting tabs attached to the inflatable curtain at an attachment location, the method comprising:

placing the thin film and undeployed inflatable curtain in a channel, such that the thin film is selectively situated between the undeployed inflatable curtain and the channel, wherein the first edge and the second edge protrude from the channel;

displacing a first blade tangentially to the undeployed inflatable curtain, wherein the blade displaces the first edge of the thin film over the undeployed inflatable curtain to a position proximate to the attachment location;

displacing a second blade tangentially to the undeployed inflatable curtain, wherein the blade further displaces the second edge of the thin film and the mounting tabs over the first blade;

retracting the first blade; and adhering the first edge of the thin film to the second edge of the thin film.

16. The method as recited in claim 15, wherein the first edge is adhered to the second edge by a heating process.

17. The method as described in claim 15, wherein the first edge is adhered to the second edge by use of an adhesive.

18. The method as recited in claim 15, wherein the channel in "U" shaped.

19. The method as recited in claim 15, wherein the inflatable curtain is substantially elongated.

20. The method as recited in claim 15, further comprising shrinking the thin film around the inflatable curtain.

21. The method as recited in claim 20, wherein shrinking the thin film comprises placing the inflatable curtain enwrapped by the thin film in an oven.

22. The method as recited in claim 15, wherein the mounting tabs are woven to the inflatable curtain.

23. The method as recited in claim 15, further comprising feeding the thin film from a roll;

cutting the thin film to a length substantially similar to the length of the inflatable curtain.

24. An inflatable curtain package, comprising:

an inflatable curtain having a plurality of mounting tabs extending from the inflatable curtain; and a thin film having a first edge and a second edge enwraping the inflatable curtain, such that first edge and the second edge form a overlap, and wherein a portion of the mounting tabs extend from the overlap and out of the thin film.

25. The inflatable curtain package of claim 24, wherein the thin film is configured to release the inflatable curtain when the inflatable curtain inflates.

26. The inflatable curtain package of claim 24, wherein the thin film comprises a perforation.

27. The inflatable curtain package of claim 24, further comprising an inflator fluidly coupled to the inflatable curtain.

28. The inflatable curtain package of claim 24, wherein the thin film maintains the inflatable curtain in a rolled configuration.

29. The inflatable curtain package of claim 24, wherein the thin film maintains the inflatable curtain in a folded configuration.

30. The inflatable curtain package of claim 24, wherein in the undeployed state the inflatable curtain is elongated.

31. The inflatable curtain package of claim 24, wherein the thin film is shrink fitted around the inflatable curtain.

32. The inflatable curtain package of claim 24, wherein the first edge and the second edge are heat sealed together.

33. The inflatable curtain package of claim 24, wherein the first edge and the second edge are adhered together by an adhesive.

34. The inflatable curtain package of claim 24, wherein the inflatable curtain is tapered.

35. An inflatable curtain package, comprising:

an inflatable curtain having a plurality of woven mounting tabs extending from the inflatable curtain, wherein the woven mounting tabs have a base portion and an end portion; and a thin film having a first edge and a second edge enwraping the inflatable curtain, such that first edge and the second edge are heat sealed together, and wherein the base portions of the woven mounting tabs are positioned under the thin film and an end portion of the woven mounting tabs extend out from the thin film.

36. The inflatable curtain package of claim 35, wherein the first edge and the second edge form an overlap.

37. The inflatable curtain package of claim 36, wherein the end portion of the woven mounting tabs extend out from the thin film at the overlap.

38. The inflatable curtain package of claim 35, wherein the inflatable curtain and the woven mounting tabs are integrally formed.

39. The inflatable curtain package of claim 35, wherein in the undeployed state the inflatable curtain is substantially cylindrical, wherein the woven mounting tabs are spaced along the length of the cylindrically shaped inflatable curtain.

* * * * *